United States Patent [19]
Duran

[11] 4,191,236
[45] Mar. 4, 1980

[54] CAPTIVE PANEL FASTENER ASSEMBLY

[75] Inventor: John A. Duran, Glendora, Calif.

[73] Assignee: Avibank Mfg., Inc., Burbank, Calif.

[21] Appl. No.: 823,397

[22] Filed: Aug. 9, 1977

[51] Int. Cl.² .............................................. F16B 43/00
[52] U.S. Cl. ........................................ 151/69; 151/8;
151/11
[58] Field of Search ............. 151/69, 8, 11, 41.7,
151/41.74, 41.75; 24/221 A

[56] References Cited

U.S. PATENT DOCUMENTS

| | | | |
|---|---|---|---|
| 1,069,496 | 8/1913 | Symons | 151/11 X |
| 2,335,828 | 11/1943 | Herget | 151/8 X |
| 2,369,297 | 2/1945 | Johnson | 151/41.7 X |
| 2,737,222 | 3/1956 | Becker | 151/41.5 |
| 2,976,901 | 3/1961 | Heyworth | 151/11 |
| 3,294,140 | 12/1966 | Cosenza | 151/69 X |
| 3,404,716 | 10/1968 | Cosenza | 151/69 X |
| 3,765,465 | 10/1973 | Gullistan | 151/69 |
| 3,995,675 | 12/1976 | Cosenza | 151/69 |

*Primary Examiner*—James C. Mitchell
*Attorney, Agent, or Firm*—Poms, Smith, Lande & Rose

[57] ABSTRACT

A panel fastener including a stud assembly and a receptacle assembly for receiving the stud assembly therein. Both the stud assembly and the receptacle assembly include mating locking teeth and a movable pin permitting the teeth to be locked together without rotation or applying torque to the teeth preventing rotation of the same and for disengaging the teeth also without rotating or applying torque to the same.

4 Claims, 10 Drawing Figures

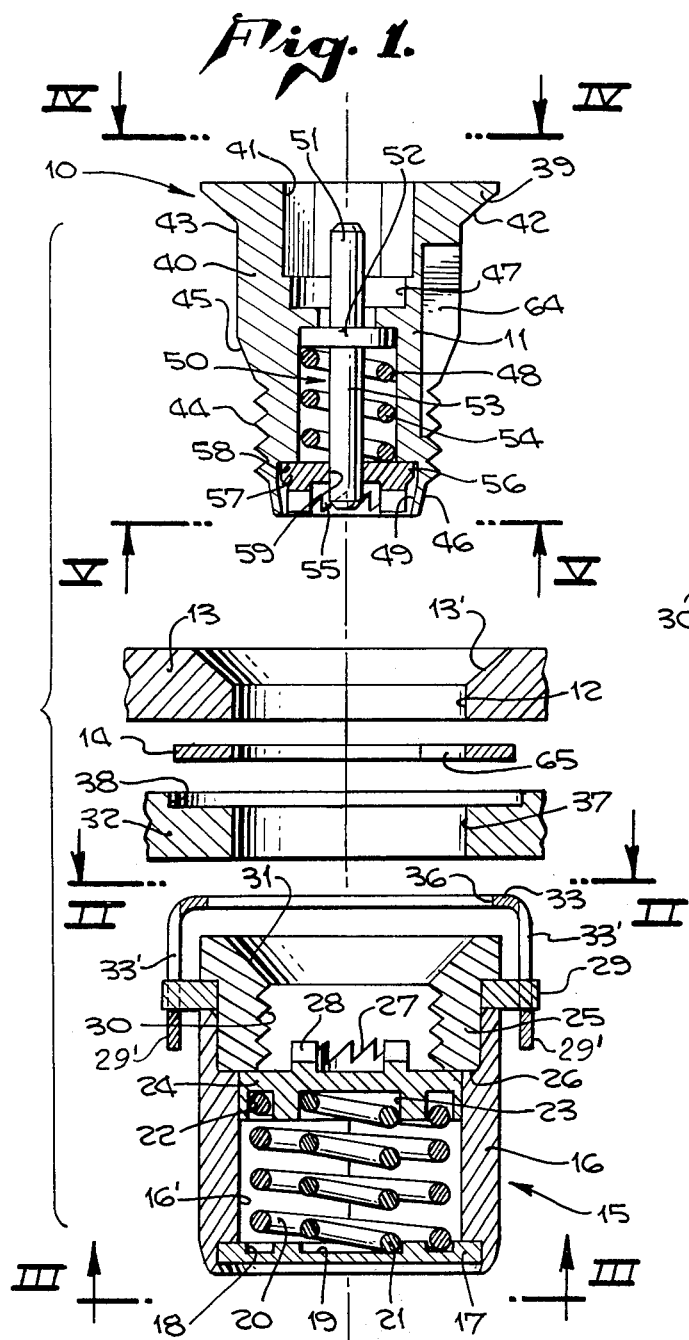
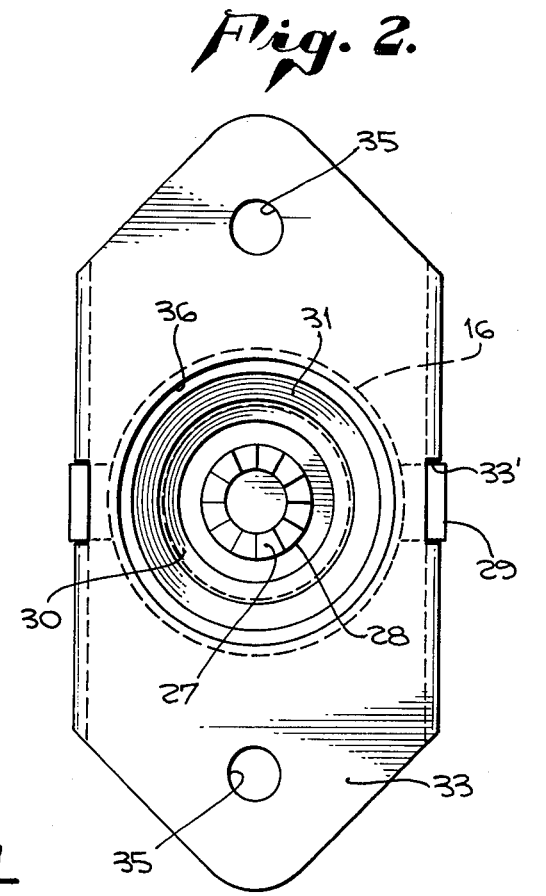
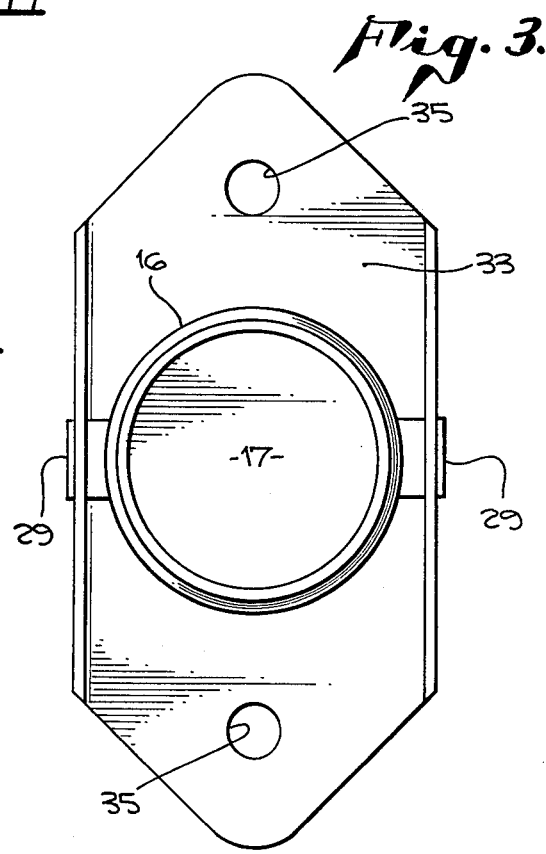
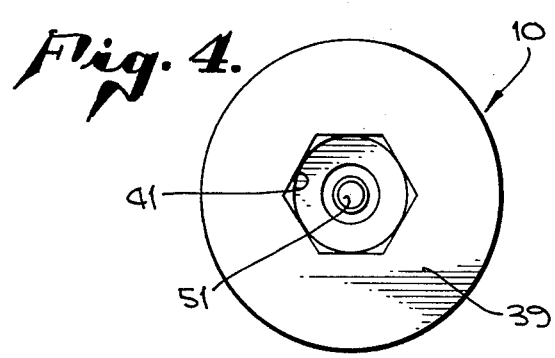

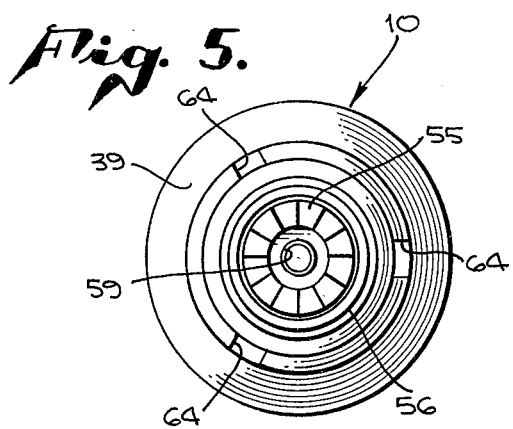
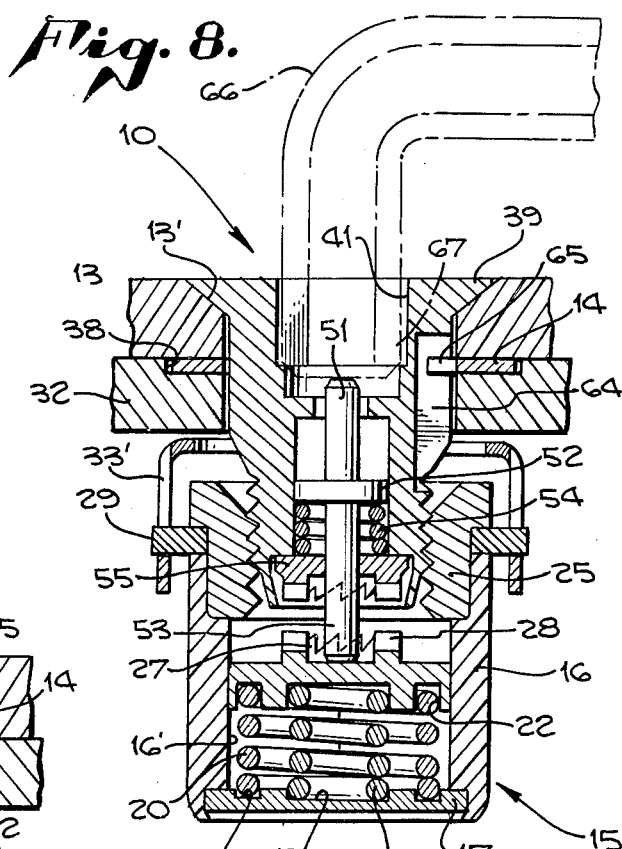
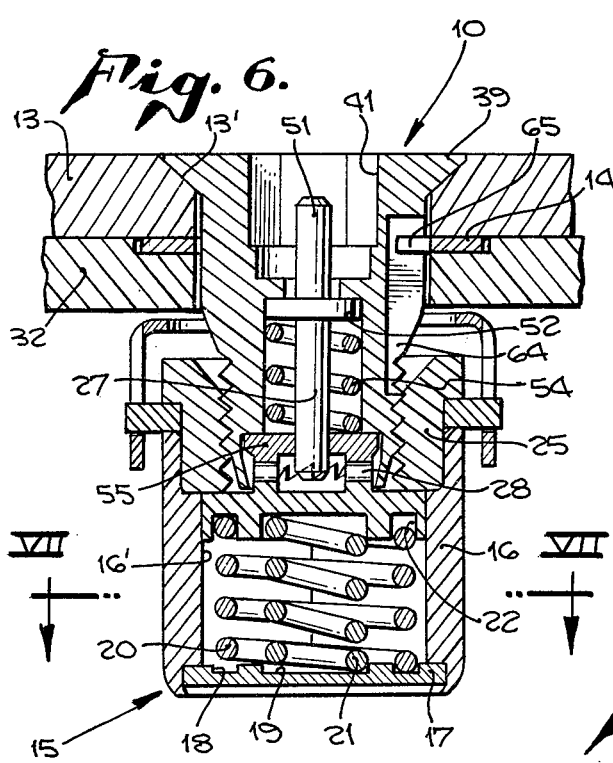
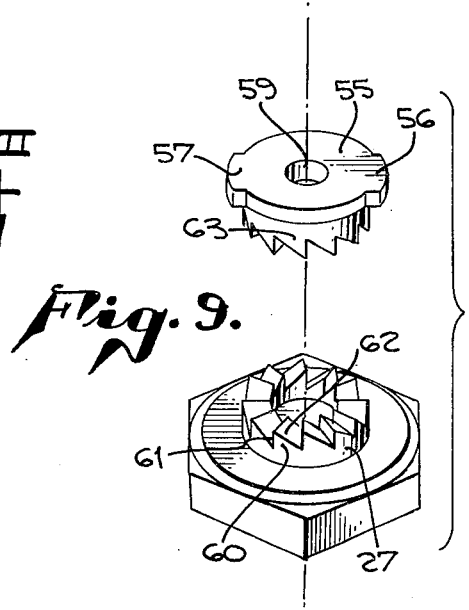
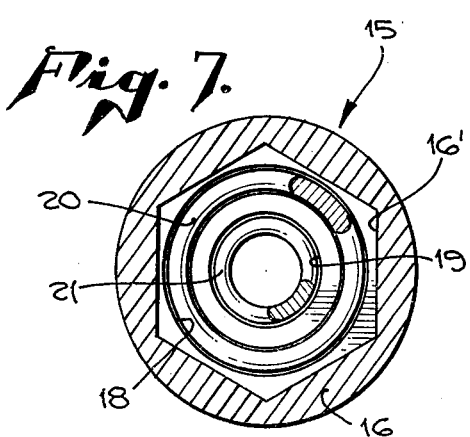
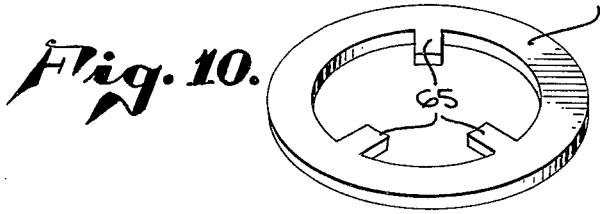

CAPTIVE PANEL FASTENER ASSEMBLY

BACKGROUND OF THE INVENTION

1. Field of the Invention

The invention relates to quick action fasteners; and, more particularly, to fasteners known as panel fasteners used to secure panels to structural frame members in aircraft and the like.

2. Description of the Prior Art

Certain removable panel members, such as access panels, are located on aircraft and the like to provide access to certain equipment on the aircraft. The fasteners used on such panels must be capable of quick action permitting ready removal and replacing of the access panel in as short a time as possible.

In addition to being quick acting, such panel fasteners must be able to withstand vibration and high temperature and stresses put on the panels. The fasteners should also be able to align the openings in the panel with openings in the aircraft structure even if misalignment takes place. In addition, workers use part of such panel fasteners as a handle to carry the panels to which they are attached. Such part should not be easily dislodged when used as a handle and be fully retractable to provide a sufficient grasp. Such retraction prevents damage to the fastener if the access panel is laid flat or moved by sliding on a surface.

Although various panel fasteners have been suggested in the past, such fasteners can be disengaged by applying sufficient torque. There is a need for a panel fastener having a one-way lock that cannot be disengaged easily when locked. Also, when torque is applied to unscrew such prior art panel fasteners, wear takes place on the components of the fastener. It is necessary to have a panel fastener with a long life that can be easily disengaged without placing stress on the locking components.

SUMMARY OF THE INVENTION

It is an object of this invention to provide an improved panel fastener which can be disengaged without placing stress on the locking components thereof.

It is a further object of this invention to provide such a panel fastener having locking components which are only in contact when locked.

It is still another object of this invention to provide a panel fastener having locking components which remain in engagement under severe harmonic vibrations.

It is a further object of this invention to provide a panel fastener having improved means thereon which permits displacement of the panel fastener with respect to the panel to which it is secured while retained such means on the panel fastener.

These and other objects are preferably accomplished by providing a panel fastener assembly which includes a stud assembly and a receptacle assembly for receiving the stud of the stud assembly therein. Both the stud and the receptacle of the receptacle assembly include mating locking teeth and a movable pin permitting the teeth to be locked together without rotation or applying torque to the teeth preventing rotation of the same and for disengaging the teeth, also without rotating or applying torque to the same.

BRIEF DESCRIPTION OF THE DRAWING

FIG. 1 is an exploded view of a panel fastener assembly in accordance with the invention;

FIG. 2 is a view taken along lines II—II of FIG. 1;

FIG. 3 is a view taken along lines III—III of FIG. 1;

FIG. 4 is a view taken along lines IV—IV of FIG. 1;

FIG. 5 is a view taken along lines V—V of FIG. 1;

FIG. 6 is an assembled cross-sectional view of the panel fastener assembly of FIG. 1;

FIG. 7 is a view taken along lines VII—VII of FIG. 6;

FIG. 8 is a cross-sectional view, similar to FIG. 6, showing a tool inserted in the socket of the stud assembly of the panel fastener assembly;

FIG. 9 is an exploded view of the locking elements alone of the panel fastener assembly of FIGS. 1 through 8; and FIG. 10 is a perspective view of one of the elements of the assembly of FIG. 1 prior to installation thereon.

DESCRIPTION OF THE PREFERRED EMBODIMENT

Referring to FIG. 1 of the drawing, a stud assembly 10 is shown having a fastening sleeve 11 which is insertable through an opening 12 in an access panel 13 and held affixed to the access panel 13 by a rigid retainer ring 14.

The receptacle assembly 15 includes a receptacle or case 16 closed at the bottom by a plug 17, outer periphery of the case 16 surrounding plug 17 being bent inwardly or swaged so as to retain plug 17 in position. Plug 17 includes an outer groove 18 and a concentric inner cavity 19 receiving therein a pair of concentric springs 20 and 21, respectively within a hexagonally-shaped chamber 16' (see also FIG. 7). The upper ends of springs 20, 21 are retained within like grooves 22, 23 in a movable ratchet member 24. Grooves 22, 23 are thus vertically aligned with respective grooves 18, 19 as shown in FIG. 1. Member 24 is limited within case 16 in its upward movement by an inner sleeve 25 having an abutment shoulder 26. Member 24 and the interior of case 16 may be irregularly configured, such as hexagonally configured, to prevent rotation. Member 24 carries a locking member 27 on its upper surface surrounded by a boss 28 formed on the upper surface of member 24 as will be discussed. Sleeve 25 retains a flanged ring 29 and fixes it to case 16. That is, springs 20, 21 normally bias locking member 27 upwardly in FIG. 1, the uppermost position thereof being limited by abutment of member 24 with shoulder 26. A threaded throughbore 30 extends through sleeve 25 providing access to locking member 27. A tapered portion 31 on sleeve 25 leads into throughbore 30 for guiding a threaded portion 44 of stud assembly 10 therein, as will be discussed.

As particularly contemplated by the present invention, springs 20, 21 and the associated structure provide means for ensuring that at least one spring is always functioning if severe harmonic vibrations are placed on the panel fastener.

Case 16 is retained on the underside of the understructure 32 by a cage 33 coupled to case 16 at flanged ring 29 by the flanges 29' thereof entering openings 33' in cage 33. Rivets (not visible) enter apertures 35 in cage 33 (FIG. 2) and suitable apertures (also not visible) in panel understructure 32 retain the opening or throughbore 30 in case 16 in alignment with both the opening 36 in cage 33 and opening 37 in understructure 32 and opening 12 in panel 13. The understructure 32 may be recessed or counterbored as at 38 surrounding opening 37 to accommodate retaining ring 14 to permit panel 13 to be positioned flush with understructure 32. If the receptacle assembly 15 is damaged or otherwise desired to be replaced, the flanges of the cage 33 may be bent and the receptacle assembly 15 removed and replaced by another.

Sleeve 11 is provided with a head 39 of a larger diameter than depending shank 40 and with a hexagonally shaped socket 41 (see also FIG. 4) for receiving an allen wrench or the like therein. The head 39 is joined to shank 40 by a tapered portion 42 to be received in a complementary countersunk portion 13' in access panel 13 to flush mount sleeve 11. Of course, any type of head may be used having any suitable means for applying a comparable tool thereto for rotating sleeve 11, as will be discussed.

Sleeve 11 includes a first enlarged portion 43 below tapered portion 42 and a second threaded portion 44, of lesser diameter than first enlarged portion 43, joined thereto by a tapered portion 45. A final or terminal tapered end 46 extends from portion 44 and is swaged inwardly to retain the internal components of stud assembly 10 therein. The stud assembly 10 includes a throughbore comprised of socket 41, a throughpassage 47, of lesser diameter than socket 41, an internal chamber 48 of lesser diameter than throughpassage 47, and an end chamber 49 of greater diameter than chamber 48.

As particularly contemplated in the present invention, stud assembly 10 includes means for both locking stud assembly 10 to case 16 in engagement with locking member 27, and releasing stud assembly 10 from locking engagement without the need for rotating the locking members. In the exemplary embodiment of the invention, such means includes a release pin 50 trapped in the throughbore through stud assembly 10 and movable therein. Pin 50 includes a first elongated portion 51 extending into socket 41, a flange 52 within chamber 48 of a diameter greater than throughpassage 47, and a second elongated portion 53 extending into chamber 49 but above the terminal or lower end of stud assembly 10. Thus, pin 50 is movable within chamber 48 and the flange forming throughpassage 47 prevents further upward movement of pin 50. A spring 54 surrounds second portion 53 and normally biases pin 50 upwardly in FIG. 1.

As particularly contemplated in the present invention, locking means are provided for locking stud assembly 10 to case 16. Such locking means includes the aforementioned locking member 27 (FIG. 1) and a mating locking element 55 (see also FIGS. 2 and 5) fixedly secured in chamber 49. As can be seen in FIGS. 1 and 5, element 55 has a pair of lugs or ears 56, 57 which enter suitable openings in the wall of sleeve 11 surrounding chamber 49 to retain element 55 in locked position. The swaging at portion 46 serves to retain element 55 in fixed, non-rotating position and element 55 abuts against an internal shoulder 58 at the junction of chambers 48 and 49. Element 55 has a throughbore 59 (FIGS. 1 and 5) receiving pin portion 53 therethrough in sliding relationship thereto. Aforementioned spring 54 abuts against both the underside of flange 52 and the upper surface or top of element 55. Thus, as pin 50 is moved downwardly in FIG. 1 against the bias of spring 54, the lowermost end of pin portion 53 extends below the lowermost portion of tapered portion 46 as will be discussed with respect to FIG. 8.

In most prior art panel fasteners of this type, once locked, the locking elements can be disengaged by applying sufficient torque thereto. This causes wear on the locking elements and reduces their life expectancy. Thus, in the exemplary embodiment of our invention, it is desired that the locking elements engage in a manner in which they cannot be disengaged by rotation in a direction opposite to their engagement. This is accomplished, as shown in FIG. 9, by having the teeth of locking element 27 formed of triangular-shaped teeth, each tooth 60 having a vertical wall 61 at essentially a right angle to the base of the tooth and an angled wall 62 interconnecting the base and the wall 61 forming an angle of about 45° at the junction of walls 61, 62. The teeth 63 of element 55 is shown in FIG. 9 and are similar in configuration. Thus, when teeth 60 and 63 are engaged, the teeth cannot be rotated to disengage the same.

Sleeve 11 (FIG. 1) is provided with a plurality of axial grooves 64, such as three, for receiving a like number of inwardly extending tangs or flanged elements 65 (see also FIG. 10) on ring 14, so that ring 14 can be inserted on sleeve 11 with elements 65 entering grooves 64. These elements 65, prior to installation, are angled out of the plane of ring 14 as shown in FIG. 10, then bent flush with the plane of ring 14 by a suitable tool or the like trapping ring 14 on sleeve 11. That is, the ring 14 is free to move along the grooves 65 but stopped from removal therefrom by engagement of the upper and lower shoulders of sleeve 11 as seen in FIGS. 6 & 8. Prior art panel fasteners using such rings required additional parts to retain the ring on the stud assembly which parts must be removed, and were not replacable, to remove the ring. These rings 14 serve to retain the rigid access panel 13 free of the understructure, the stud assembly 10 being retained on the access panel, thus allowing the stud assembly 10 to be used as a handle and grasped easily by a workman in moving the panel 13 and understructure 32, thus minimizing danger to stud assembly 10 if panel 13 is laid on a surface or panel or slid thereon.

In operation, referring to FIG. 1, stud assembly 10 is inserted through the opening in panel 13. The washer or ring 14 is then attached to stud assembly 10 with flanges or elements 65 entering grooves 64, the flanges or elements 65 then being bent to trap ring 14 on stud assembly 10. The understructure 32 is riveted to case 16. The threaded portion 44 is then threaded into threaded portion 30 of case 16. As shown in FIG. 8, a tool 66, such as an allen wrench, having an end 67 configured as socket 41, is inserted into socket 41 and pushes pin 50 downwardly as shown in FIG. 8. This enables stud assembly 10 to be threaded or rotated in threaded socket 30 without engagement of locking elements 55 and 27. This element 27 moves downwardly by engagement of pin portion 53 against the bias of springs 20, 21, whereas flange 52 of pin 50 pushes down on spring 54 separating elements 55 and 27. Stud assembly 10 is either rotated until the locking elements 27, 55 mesh and lock as shown in FIG. 6 or a tool, as discussed, is used to lock the elements together without the ratchet faces ever touching. Thus, no torque or stress is placed on the teeth 60, 63 of elements 27, 55. When it is desired to disengage locking elements 27, 55, tool 66 is again inserted as in FIG. 8 and moves locking elements 27, 55 out of meshing engagement. Stud assembly 10 is then counter-rotated to unthread stud assembly 10 from case 16. Flanges or elements 56, 57 prevent locking element 55 from rotating whereas the hexagonal shape (FIG. 7) of chamber 16' prevent element 27 from rotating. Ring 14 is trapped on stud assembly 10 retaining panel 13 to assembly 10 but is never under stress and can be removed, by re-bending flanges 65, without destroying any components of stud assembly 10 or requiring an additional component. Thus, there can be no total loss of the stud assembly 10 if ring 14 is damaged.

It can be seen that we have described a panel fastener which can be locked and released in a quick and easy manner without placing stress or torque on the locking elements. Due to the configuration of teeth 60, 63, the locking elements have a oneway ratchet and can't disengage once locked. The locking elements 27, 55 are only in contact when locked and thus not in contact during installation or removal thus increasing their life expectancy. By providing a pair of springs 20, 21, if the panel fastener is placed under severe harmonic vibrations, at least one of the springs is always working.

Flanged ring 29 also provides some "float" to compensate for any misalignment. That is, cage 33 and ring 29 move relative to each other so as to provide for slight misalignment. Also, if desired to replace receptacle assembly 15, the flanges 29' on cage 33 may be sprung apart by bending flanges 29' outwardly from their FIG. 1 position thus releasing them from engagement with ring 29 thereby permitting one receptacle assembly 15 to be removed and easily replaced by another without the need for removing cage 33. That is, cage 33 may be riveted, as discussed with respect to openings 35, to understructure 32.

We claim:

1. A panel fastener assembly including; a stud nut having an enlarged head with a recess of irregular configuration adapted to receive a like configured tool therein, a threaded portion, a generally cylindrical portion interconnecting said enlarged head and said threaded portion, a cavity extending through said nut communicating with both said recess and the exterior of said nut, said cavity at the exterior of said nut forming a chamber having an inner wall, a spring-biased elongated pin mounted in said cavity and movable therein, said pin having a first portion extending into said recess and a second portion extending through an aperture in a locking element fixedly mounted in the chamber of said nut and inseparable therefrom, said locking element having a plurality of teeth extending away from said pin with means on said teeth for permitting rotation of said teeth in only one direction; and a sleeve having a generally cylindrical main body portion and a central chamber, a threaded portion communicating with said central chamber having threads thereon adapted to mate with the threaded portion of said nut, a spring-biased locking element movably mounted in said cavity and inseparable therefrom, said-mentioned locking element having a plurality of teeth configured similarly as the teeth on said first-mentioned locking element also adapted to rotate in only one direction surrounding a cavity for receiving the tip of the second portion of said pin therein when said pin is moved against its spring bias, both of said locking elements being non-rotatively mounted, the teeth on said first-mentioned locking element being entirely contained within said nut with said first-mentioned locking element having an outer periphery abutting against the inner wall of said chamber of said nut and trapped therein.

2. In the panel fastener assembly of claim 1 wherein said locking element in said sleeve is spring-biased by a pair of concentrically mounted springs in said cavity between said last-mentioned locking element and a plug closing off the bottom of said sleeve.

3. In the panel fastener assembly of claim 1 wherein each of said teeth on both of said locking elements includes a base, a first generally flat vertical face extending from said base, and a second generally flat face intersecting said base and said first face at an angle of about 45°.

4. In the panel fastener assembly of claim 1 including a cage having a generally flat apertured portion adapted to receive said threaded portion therethrough and integral flanges extending downwardly toward said sleeve from said flat apertured portion, a flange mounted on the outer periphery of said main body portion of said sleeve said flanges having apertures therein receiving therethrough said flange mounted on said main body portion, said apertures in said flanges being of a width sufficient to both trap said flange mounted on said main body portion therein while permitting said sleeve to move within said apertures in said flanges to provide a floating effect to accommodate slight misalignment of said assembly, said flanges on said apertures being bendable outwardly away from said main body portion to permit removal of said flange on said main body portion from engagement in the apertures in said flanges to permit said sleeve to be easily and quickly removed from said cage.

* * * * *